United States Patent
Knight et al.

(10) Patent No.: US 7,478,265 B2
(45) Date of Patent: Jan. 13, 2009

(54) ERROR RECOVERY FOR INPUT/OUTPUT OPERATIONS

(75) Inventors: Frederick Earl Knight, Weare, NH (US); Susan Rundbaken, Nasuha, NH (US); Rick Wagner, Monument, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 657 days.

(21) Appl. No.: 10/964,862

(22) Filed: Oct. 14, 2004

(65) Prior Publication Data

US 2006/0085665 A1    Apr. 20, 2006

(51) Int. Cl.
*G06F 11/00* (2006.01)
(52) U.S. Cl. .............................................. 714/5; 714/2
(58) Field of Classification Search .................... 714/5, 714/2
See application file for complete search history.

(56) References Cited

U.S. PATENT DOCUMENTS

| | | | | |
|---|---|---|---|---|
| 3,715,573 A * | 2/1973 | Vogelsberg | ................. | 714/33 |
| 4,821,228 A * | 4/1989 | Wickes et al. | ............... | 708/530 |
| 5,369,533 A | 11/1994 | Ottesen et al. | | |
| 5,583,982 A * | 12/1996 | Matheny et al. | ............. | 715/762 |
| 5,949,973 A * | 9/1999 | Yarom | ......................... | 726/23 |
| 6,463,509 B1 * | 10/2002 | Teoman et al. | .............. | 711/137 |
| 6,499,050 B1 | 12/2002 | Boswell, Jr. et al. | | |
| 6,594,709 B1 | 7/2003 | Agasaveeran et al. | | |
| 6,625,755 B1 | 9/2003 | Hirata et al. | | |
| 6,687,849 B1 * | 2/2004 | Cherf | ............................ | 714/5 |
| 6,832,379 B1 * | 12/2004 | Zeryck et al. | ............... | 719/327 |
| 6,918,054 B2 * | 7/2005 | Hirata et al. | .................. | 714/17 |
| 7,076,690 B1 * | 7/2006 | Todd et al. | ..................... | 714/13 |
| 7,266,538 B1 * | 9/2007 | Shatil | ............................ | 707/1 |
| 7,293,030 B2 * | 11/2007 | Lanzatella et al. | .......... | 707/101 |
| 7,340,179 B2 * | 3/2008 | Goldsmith | ................... | 389/118 |
| 2004/0008360 A1 | 1/2004 | Ankrum et al. | | |
| 2005/0021879 A1 * | 1/2005 | Douglas | ........................ | 710/5 |
| 2005/0132133 A1 * | 6/2005 | Keohane et al. | ............. | 711/112 |
| 2005/0228769 A1 * | 10/2005 | Oshima et al. | ................. | 701/1 |
| 2005/0265389 A1 * | 12/2005 | Mangin et al. | ............. | 370/469 |

FOREIGN PATENT DOCUMENTS

| | | |
|---|---|---|
| JP | H06-231537 | 6/1994 |
| JP | 09-128305 | 5/1997 |
| JP | 2000-148604 | 5/2000 |
| JP | 2003-151214 | 5/2003 |
| JP | 2003-330794 | 11/2003 |

OTHER PUBLICATIONS

Notice of Rejection from Japanese Patent Office for counterpart application No. 2005-296003, mailed Jun. 7, 2007, with English translation (7pgs).

American National Standard of X3T10, SCSI-3 Block Commands (SBC), Feb. 13, 1997, Publisher: American National Standards Institute, Inc., New York, New York, Published in: US.

* cited by examiner

*Primary Examiner*—Scott T. Baderman
*Assistant Examiner*—Loan Truong

(57) ABSTRACT

Method, system, and apparatus for executing input/output operations. The method including selecting a level of error recovery for input/output operations, receiving a request to execute the input/output operation, attempting the input/output operation, and when the input/output operation fails, performing the level of error recovery specified. The selection of the error recovery level may be done by a user, or embedded within the input/output request itself.

12 Claims, 4 Drawing Sheets

ERROR RECOVERY FOR INPUT/OUTPUT OPERATIONS

BACKGROUND

Storage driver sub-systems are designed to store (write) and retrieve (read) user data from permanent storage media. Driver sub-systems, however, cannot always complete input/output (I/O) operations. In some instances, the driver sub-system can fail to complete a requested I/O operation after a given number of unsuccessful attempts to read or write data. Other systems, though, cannot recognize a failure or choose to ignore failures during I/O operations. In these instances, the driver sub-system may continually or indefinitely attempt the read or write operation.

To mitigate the impact of failed storage devices and failed I/O operations, layers of the storage I/O stack have been developed to add redundancy. One way to mitigate the effect of failed storage devices is to write copies of the data in multiple locations. In this way, if an I/O failure were to occur on any given part of the data, the data is still available in another location. This layer of the I/O stack is generally known as a Logical Storage Manager (LSM), or Logical Volume Manager (LVM). Hardware has also been developed to provide this redundancy. These storage devices are known as Redundant Array of Independent (or Inexpensive) Disks controller, RAID controllers.

Control of an I/O operation and any associated error recovery passes from layer to layer with the request to perform the operation. Currently, when an I/O operation is issued from the LSM/LVM layer to the underlying device driver, the device driver is in control of the I/O operation, any error recovery, or retries. The same is true when the device driver issues the I/O to the device itself (including a RAID controller); the device then is in control of the I/O, any error recovery, or retries.

In the case of Small Computer System Interface (SCSI) devices, a method exists to establish the error recovery/retry methodology of a SCSI storage device. This method is performed through the operating system via the SCSI Error Recovery Mode page. Many storage devices and operating systems, however, do not fully implement this method. In addition, if used on a per I/O basis, this method would substantially degrade performance.

Applications desire that their I/O requests be completed as quickly as possible. When error recovery is invoked by the underlying hardware or software device driver, that recovery may unnecessarily delay the completion of the I/O operation of the application. For example, in a mirrored situation, when one unit begins to fail, switching to the alternate data set may be preferred to initiating error recovery on the unit that is beginning to fail. However, since layered protocol stacks generally prohibit boundary crossing, it is not desirable for the underlying device driver, or even possible for the hardware, to know when it should do error recovery, and when it should not.

In one solution, the underlying device driver offers timers to the higher layers. The LSM/LVM layer decides the amount of time each I/O operation is allowed and specifies this time to the lower layer (where the actual timing occurs). The device driver then completes the I/O within that time. The device driver either returns the data successfully, or the I/O is terminated, and a failure is returned. This solution, however, adds significant complexity to the device driver layers. The device driver must determine how long it takes to terminate an I/O operation (even determining the exact value to use may not be possible when using some I/O protocols), and subtract the determined time from the user's requested time limit. For example, if the LSM/LVM layer were to request a 20 second time limit but the device driver takes 5 seconds to terminate an I/O, then only 15 seconds can be used to perform the I/O. After 15 seconds, the I/O is terminated, and then prior to the specified 20 second limit, the I/O can be returned with the failing status.

SUMMARY

Embodiments in accordance with the present invention provide methods, systems, and apparatus for executing input/output operations for a storage device. In one exemplary embodiment, a method includes selecting, by a user, a level of error recovery for input/output operations for a storage device, receiving a request to execute the input/output operation, attempting the input/output operation, and when the input/output operation fails, performing the level of error recovery specified by the user.

In another embodiment, a storage device is provided. The storage device includes a storage medium for storing data, a control circuit, coupled to the storage medium, that controls the operation of the storage device, and an error recovery function associated with the control circuit, the error recovery function having a level of error recovery to use for all input/output operations, wherein the level of error recovery is selected from a plurality of different levels of error recovery and input from a user.

In another embodiment, a method is provided. The method includes receiving a request for an input/output operation, determining an error recovery level to use if the input/output operation fails, embedding a state signal that indicates the error recovery level into a command to execute the input/output operation, and issuing the command.

Other embodiments and variations of these embodiments are shown and taught in the accompanying drawings and detailed description.

DETAILED DESCRIPTION

In the following detailed description, reference is made to the accompanying drawings that form a part hereof, and in which is shown by way of illustration specific illustrative embodiments in which embodiments in accordance with the invention may be practiced. These embodiments are exemplary and described in sufficient detail to enable those skilled in the art to practice the invention, and it is to be understood that other embodiments may be utilized and that logical, mechanical, electrical, or algorithmic changes may be made without departing from the spirit and scope of the present invention. The following detailed description is, therefore, not to be taken in a limiting sense.

I. Overview

Embodiments of the present invention enable tuning, adjusting, or selecting error recovery for input/output (I/O) operations. Selective tuning of the level of error recovery, for example, may be used to recover from a failed I/O operation. Section II below describes an exemplary embodiment in which the level of error recovery used for failed I/O operations is selected by a user through, for example, a management interface. This embodiment enables the error recovery technique to be changed without direct involvement of the operating system. In this embodiment, the error recovery level is set for all I/O operations for the storage device as a whole, or for an individual sub-unit of the storage device (such as a SCSI LUN, or logical unit). Section III below describes an exemplary embodiment in which the level of error recovery is selected on a per I/O basis using an embedded signal in an I/O command. The embedded signal, in one embodiment, controls the error recovery procedures executed in the storage device. In another embodiment, the embedded signal controls the error recovery procedures executed at the device driver of the operating system or at some other level of the I/O stack through which the I/O must pass.

Figure 1:
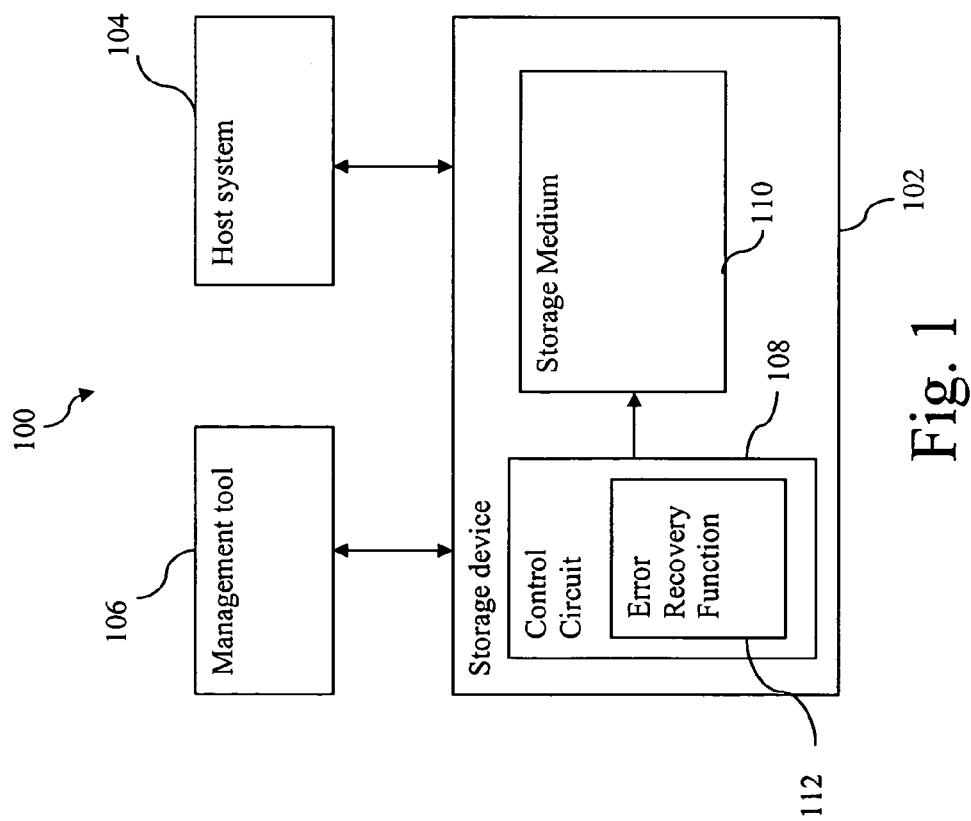
FIG. 1 is a block diagram of one exemplary embodiment of an information system with a storage device that enables tuning of the error recovery technique used for a failed input/output operation.

II. Error Recovery in a Storage Device Without Direct Operating System Involvement FIG. 1 is a block diagram of an information system, indicated generally at 100, with a storage device 102 that enables tuning of the error recovery technique used for a failed input/output operation. Storage device 102 is coupled to a host system 104, e.g., a computer, network, or other appropriate electronic circuit that stores data in a storage device. Storage device 102 is also coupled to a management tool or interface 106 that is used to configure aspects of storage device 102. In one embodiment, management tool 106 comprises a management console that is coupled to storage device 102 over a direct connection. In other embodiments, management tool 106 is provided as a command line interface or graphical user interface (GUI) to storage device 102. In one embodiment, the management tool 106 runs as an application on host system 104.

In one embodiment, storage device 102 comprises a plurality of logical units (LUNs) such that storage device 102 is physically one device but presents to host system 104 the appearance of a number of independently controlled storage devices. When storage device 102 is implemented with a plurality of LUNs, the tuning of error recovery techniques can be controlled independently for each LUN. Thus, for purposes of this specification, the term "storage device" is meant to cover either a physically independent storage device or a plurality of LUNs implemented with at least some of the LUNs existing on the same physical device.

Storage device 102 provides a storage medium 110 for reading and writing data for host system 104. In one embodiment, storage medium 110 comprises one or more of a magnetic disk, an optical disk, a tape, a Flash memory or other appropriate medium for the electronic storage of data.

Storage device 102 reads data from and writes data to storage medium 110 through control circuit 108. Control circuit 108 is implemented as one or more of software, hardware or firmware. Control circuit 108 includes, in one aspect, an error recovery function 112. Error recovery function 112 controls the error recovery operations that are performed when an input/output operation executed by control circuit 108 fails. In one embodiment, the level of error recovery is selected through management tool 106 and is established at a selected level for all input/output operations. In one embodiment, the management tool 106 is used to select between two states with different levels of error recovery. In one state, the error recovery function 112 is enabled to limit error recovery. For example, in this state, the error recovery is limited to returning an error when the input/output operation fails. In another state, a higher level of error recovery is provided. In this state, for example, the error recovery function 112 is enabled to try multiple times (such as a specified number of times) or possibly indefinitely to perform the input/output operation. Thus, in one embodiment, the two states are differentiated by the number of error recovery attempts that are tried before an error is returned with a larger number of error recovery attempts made in one state and fewer error recovery attempts in the other state. In one embodiment, the management console is used to select the state that performs fewer error recovery operations when the data stored on the storage medium 110 is also available on another storage device. Further, the state that performs more error recovery operations is selected when the data stored on the storage medium 110 is not available elsewhere.

In this embodiment, the management tool 106 is used to set the level of error recovery so that the operation of the storage device is independent of the operating system running on the host system 104. As such, the operating system of the host system 104 does not need to have independent knowledge of the state of the data on the storage medium 110. Further, the host system 104 does not need to do anything different in retrieving the data. Therefore, various states of error recovery may be used across operating system platforms without the need to modify existing operating systems.

Figure 2A:
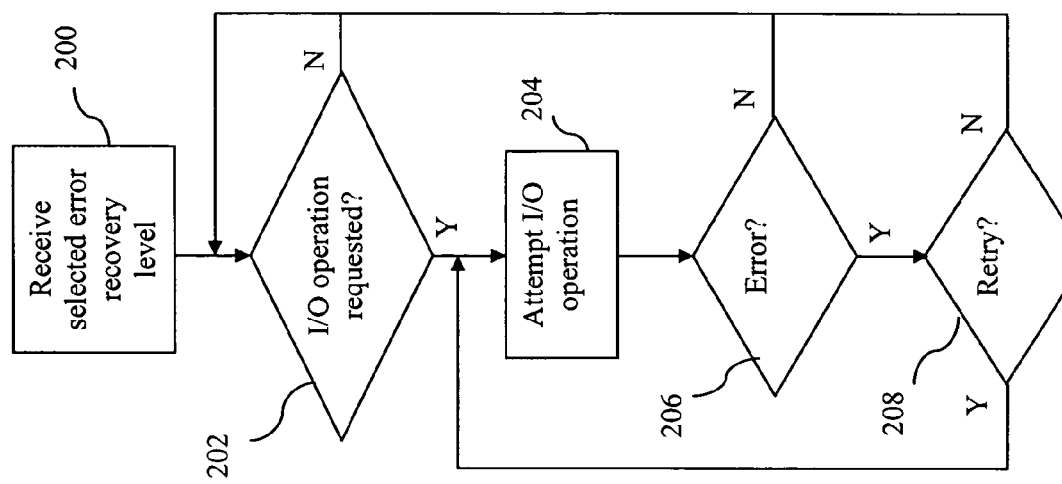
FIGS. 2A and 2B are flow charts of exemplary embodiments of methods for executing an input/output operation for a storage device with an error recovery level that is selected, independent of the operating system, for all input/output operations.

FIG. 2A is a flow chart of one embodiment of a method for executing an input/output operation for a storage device with an error recovery level that is selected, independent of the operating system, for all input/output operations. The method begins at block 200. At block 200, the error recovery level to be used for failed input/output operations for a storage device is selected for all input/output operations to be executed by the storage device. In one embodiment, this selection of error recovery level is accomplished by a user through a management interface. The selection of the error recovery level in this manner enables the method to be applied across a wide variety of operating systems without any modification to the standard operations of the operating system. Once selected, appropriate parameters of the storage device are updated to comply with the selected error recovery level.

The method processes input/output (I/O) requests. At block 202, the method determines if an I/O request has been received. In one embodiment, the I/O requests include requests to read data from and requests to write data to the storage device. If there is no I/O request available, the process returns to wait for an I/O request at block 202. If, however, there is an I/O request, the method proceeds to block 204. At block 204, the method attempts the I/O operation at the storage device. The method determines if there is an error in the I/O operation at block 206. If there is no error, the I/O operation is complete, a success indicator is returned, and the method returns to block 202. If, however, there is an error in the I/O operation, the method proceeds to block 208.

At block 208, the method performs any error recovery enabled for the storage device. The method determines the level of error recovery for the selected state for the storage device. If the selected state allows error recovery, the process returns to block 204 to retry the I/O operation. If, however, the state does not allow error recovery. The process returns to block 202. Further, the process returns an error message indicating that the I/O operation failed. This embodiment has been described with two levels of error recovery. In other embodiments, more than two levels of error recovery are used thereby providing levels of error recovery between the extremes of no retries and indefinite retries based on the application and data involved.

Figure 2B:
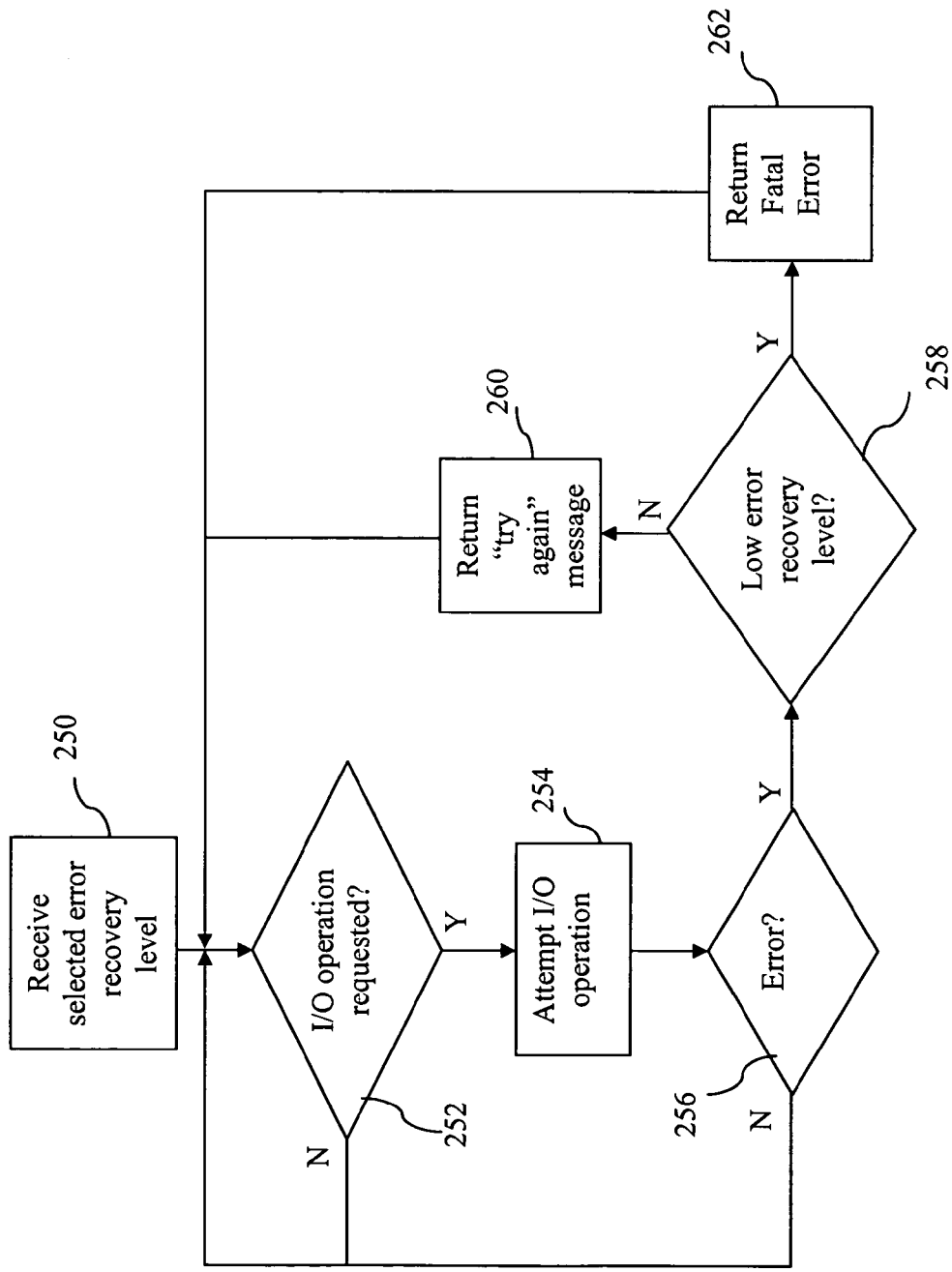

FIG. 2B is a flow chart of another embodiment of a method for executing an input/output operation for a storage device with an error recovery level that is selected, independent of the operating system, for all input/output operations. The method begins at block 250. At block 250, the error recovery level to be used for failed input/output operations for a storage device is selected for all input/output operations to be executed by the storage device. In one embodiment, this selection of error recovery level is accomplished by a user through a management interface. The selection of the error recovery level in this manner enables the method to be applied across a wide variety of operating systems without any modification to the standard operations of the operating system. Once selected, appropriate parameters of the storage device are updated to comply with the selected error recovery level.

The method processes input/output (I/O) requests. At block 252, the method determines if an I/O request has been received. In one embodiment, the I/O requests include requests to read data from and requests to write data to the storage device. If there is no I/O request available, the process returns to wait for an I/O request at block 252. If, however, there is an I/O request, the method proceeds to block 254. At block 254, the method attempts the I/O operation at the storage device (including retries and error recovery). The method determines if there is an error in the I/O operation at block 256. If there is no error, the I/O operation is complete, a success indicator is returned, and the method returns to block 252. If, however, there is an error in the I/O operation, the method proceeds to block 258.

At block 258, the method examines the selected error recovery level. If the method determines that the error recovery level is low, then the method proceeds to block 262. At block 262, the method returns a fatal error indication to the host operating system and returns to block 252. If, however, at block 258, the method determines that a higher error recovery level is selected, then the method proceeds to block 260 and returns a "try again" message to the operating system. At this point, the method returns to block 252 and waits for a requested I/O operation. This embodiment has been described with two levels of error recovery. In other embodiments, more than two levels of error recovery are used thereby providing levels of error recovery between the extremes of no retries and indefinite retries based on the application and data involved.

III. Error Recovery on a Per I/O Basis

Figure 3:
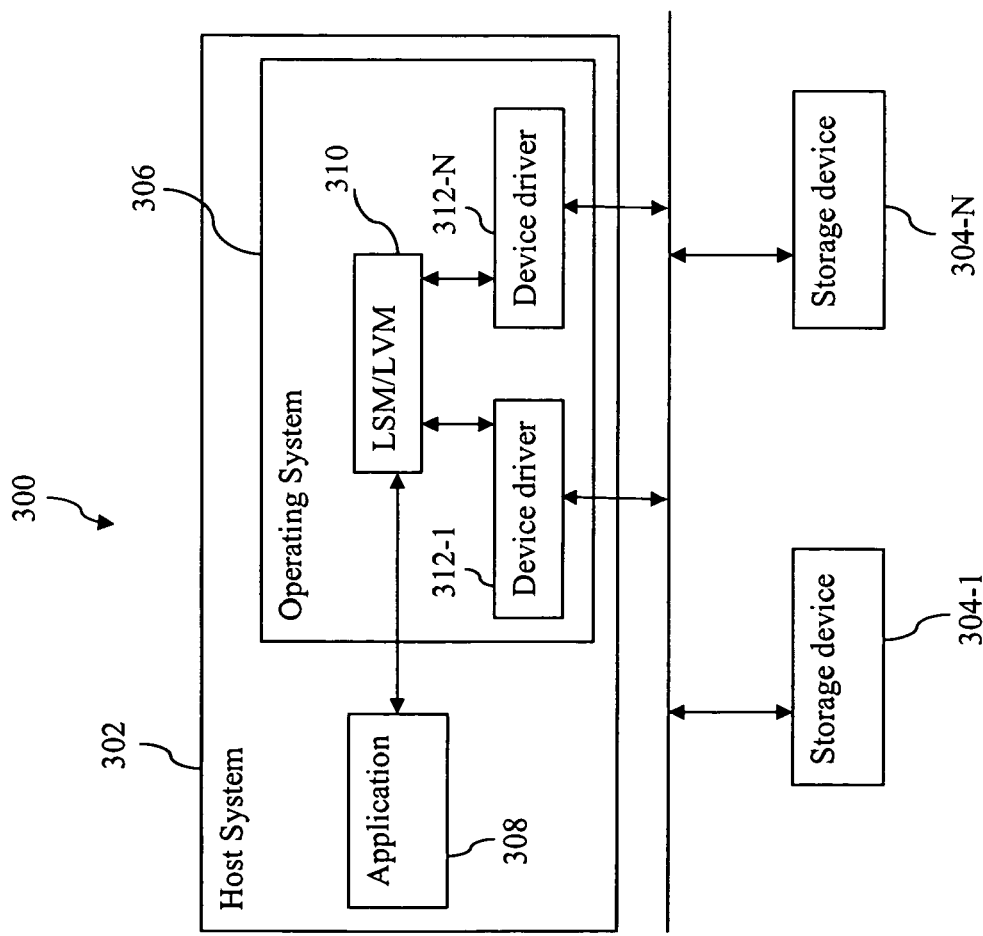
FIG. 3 is a block diagram of one exemplary embodiment of a system that enables tuning of the system's error recovery mechanism for failed input/output (I/O) operations on a per I/O basis.

FIG. 3 is a block diagram of one embodiment of a system, indicated generally at 300, that enables tuning of the system's error recovery mechanism for failed input/output (I/O) operations on a per I/O basis. System 300 includes a host system 302 that runs applications, represented by application 308, and an operating system 306. Application 308 stores and retrieve data under the control of operating system 306. Operating system 306 stores the data in storage devices 304-1 to 304-N. System 300 is shown with two storage devices. It is understood that any appropriate number of storage devices is included in a particular system and the application is not limited to use with two storage devices. Further, it is understood that storage devices 304-1 to 304-N, in one embodiment, comprise physically separate storage devices. In other embodiments, storage devices 304-1 to 304-N comprise logical units (LUNs) that may be part of the same physical device. In the case of LUNs, the error recovery mechanism used for failed I/O operations may be tuned independently for each LUN even when the LUNs are on the same physical device. Thus, as discussed above, the term storage device as used in this specification is not limited to an entire, independent physical device. Rather, the term covers an entire, independent physical device as well as a portion of a physical device.

Operating system 306 includes a number of layers that work together to execute I/O operations when requested by application 308. One layer of the operating system is conventionally referred to as a logical storage manager or logical volume manager (LSM/LVM) layer 310. This layer was developed in part to mitigate the impact of failed storage devices. In essence, the LSM/LVM layer 310 stores copies of data for application 308 in multiple locations in storage devices 304-1 to 304-N. Thus, application 308 can transparently read and write data from and to multiple locations. This enables application 308 to gain access to data even when one of the storage devices 304-1 to 304-N fails.

Operating system 306 also includes device driver instances 312-1 to 312-N. These driver instances act as the interface between the operating system 306 and the storage devices 304-1 to 304-N.

When an I/O operation is requested by application 308, operating system 306 tunes the level of error recovery used for a failed I/O operation based on whether redundant data is available for the request. The operating system 306 adjusts the level of error recovery on a per I/O basis by embedding a signal in the I/O command that selects the level of error recovery. As such, the likelihood is reduced that the operating system will be hanging due to an input/output failure when redundant data is available to fulfill the requested I/O operation. In one embodiment, LSM/LVM layer 310 of operating system 306 controls the level of error recovery performed by the storage device 304-1 to 304-N through the device drivers 312-1 to 312-N. In other embodiments, the LSM/LVM layer 310 of operating system 306 controls the level of error recovery performed by the device driver 312-1 to 312-N. Further, in one embodiment, the level of error recovery is tuned as it propagates through the various levels of system 300. For example, operating system 306 may set the error recovery level at a high level of error recovery for the device driver, e.g., device driver 312-1. The device driver 312-1 may pass this on to the storage device 304-1 as either the same level of error recovery or a different, e.g., lower level of error recovery. Thus, the level of error recovery may change as it propagates through each layer of the I/O stack from the operating system to the physical device.

In one embodiment, each of storage devices 304-1 to 304-N is constructed in a manner similar to storage device 102. In this embodiment, error recovery function 112 receives the embedded signal that selects the level of error recovery to use in performing error recovery for failed I/O operations. In this embodiment, the level of error recovery is selected on a per I/O basis. At any given time then, a storage device 304-1 to 304-N may process I/O operations contemporaneously that have different levels of error recovery.

Figure 4:
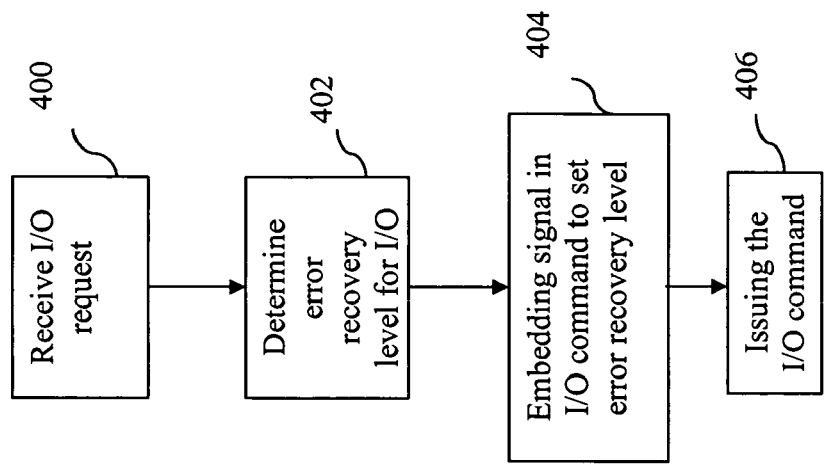
FIG. 4 is a flow chart of an exemplary method for a system to specify to a storage device how to tune error recovery in the storage device for an I/O operation.

FIG. 4 is a flow chart of a method for tuning error recovery for an I/O operation. The method begins at block 400 when an I/O request is received, e.g., from application 308. At block 402, the process determines the level of error recovery to specify for the I/O operation. In one embodiment, the process determines the level of error recovery based on the availability of redundant data. For example, when the I/O request relates to an application for which data is stored in multiple locations, the process establishes a low level of error recovery, e.g., a level of error recovery in which an error is returned when the I/O operation fails and no retries are executed. When data is not stored in redundant locations, a higher level of error recovery is selected, e.g., a state in which I/O operations are retried multiple times (possibly until they are successful). In other embodiments, more than two levels of error recovery are used thereby providing levels of error recovery between the extremes of no retries and indefinite retries based on the application and data involved.

The method proceeds to generate an I/O command based on the selected error recovery level. At block 404, the process embeds a signal indicating the error recovery level into the I/O command. For example, the process sets one or more bits in the I/O command to indicate the level of error recovery to use in the event of a failed I/O operation. In one embodiment, the I/O command includes one of a read command, a write command, verify, and any other appropriate media access commands. At block 406, the command is issued. For example, in one embodiment, the command is issued by the LSM/LVM layer to the device driver to control the error recovery performed at the device driver. In other embodiments, the command is issued from the device driver to the storage device to control the error recovery at the device.

A. Error Recovery in the Storage Device

Figure 5:
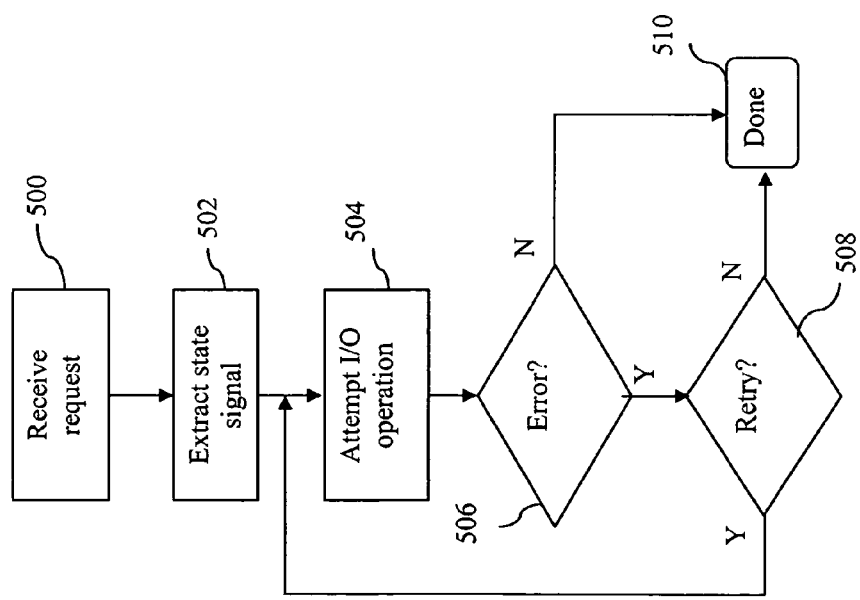
FIG. 5 is a flow chart of an exemplary method for tuning error recovery for I/O operations at the storage device based on an embedded signal received from an operating system.

FIG. 5 is a flow chart of a method for tuning error recovery for I/O operations at the storage device based on an embedded signal received from an operating system. The method begins at block 500 and receives a request for an I/O operation, e.g., a read operation, a write operation or any other appropriate media access command. At bock 502, the method extracts a signal from the command that indicates a state for error recovery operations for a failed I/O operation. In one embodiment, the state signal is embedded as one or more bits in the I/O command. At block 504, the method attempts the requested I/O operation. At block 506, the method determines whether the I/O operation failed. If not, the method is done at block 510 and a success indicator is returned to the operating system. If, however, the method determines that the I/O operation failed, the method proceeds to block 508 and determines the next steps to take based on the state signal for error recovery operations that was extracted at block 502. If the state signal indicates that no error recovery is to be performed, the method proceeds to completion at block 510 while returning an error indication to the operating system. If, however, the state signal indicated that error recovery is to be performed, the process returns to block 504 and retries the I/O operation. The method repeats this process according to the terms of the state signal. For example, in one embodiment, the state signal indicates to try indefinitely to complete the I/O operation. In other states, the method attempts a limited number of retries before returning an error signal indicating a failed I/O operation.

In one embodiment, the state signal is embedded in SCSI commands such as read(6), read(10), read(12), read(16), write(*), read long, verify(*), write and verify, and any other media access commands using one or more bit(s) in a currently reserved field or any other appropriate field. For example, any one or more of bits 5-7 of byte one of a SCSI read command can be used for this purpose. In one embodiment, when N bits are used as the state signal, up to $2^N$ states of error recovery levels are provided.

Further, in one embodiment, the parameters of a particular error recovery technique for a selected state are specified using a mode page patterned on the SCSI error recovery mode page described in draft standard for Project 996D of the X3T10 ANSI committee titled "Information Technology—SCSI-3 Block Commands (SBC)," revision 8 (Feb. 13, 1997) (hereinafter "sbc-r08"). In the sbc-r08 draft, a mode page is defined to allow an operating system to change the error recovery technique used by a SCSI device. In one embodiment, a plurality of mode pages of this variety are provided to the storage device; one is provided for each state. Based on the state signal in a particular I/O command, the error recovery functions of the corresponding mode page are executed.

B. Error Recovery in the Device Driver

Figure 6:
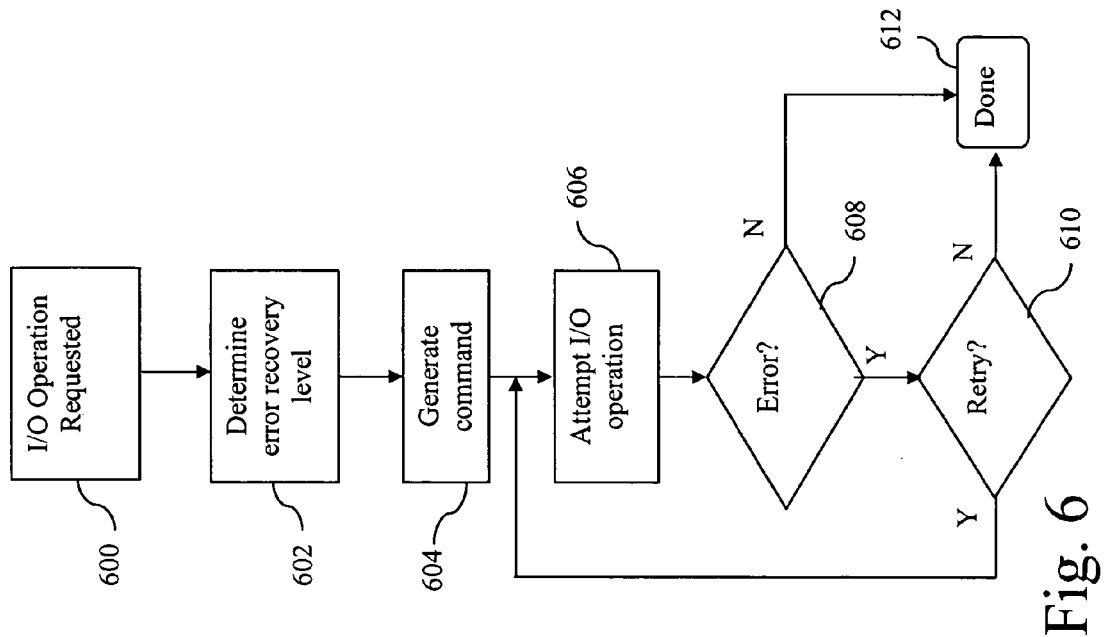
FIG. 6 is a flow chart of an exemplary method for tuning the error recovery techniques used in a device driver for a failed I/O operation.

FIG. 6 is a flow chart of a method for tuning the error recovery techniques used in a device driver for a failed I/O operation. The method begins at block 600 when an I/O operation is requested by an application. At block 602, the method determines the error recovery level to be used for a failed I/O operation. In one embodiment, the state of error recovery operations is selected based on whether the data associated with the I/O request is stored in multiple locations. In one embodiment, the method selects one of a plurality of states for the error recovery technique, e.g., a state in which an I/O command is retried many times (possibly indefinitely) upon failure of the I/O operation, another state in which an error is returned upon a failed I/O operation, and any appropriate states with other levels of error recovery. At block 604, the method generates a command to perform the I/O operation. The command includes an embedded signal that indicates the selected state of the error recovery operations to be performed in the event of a failed I/O operation. The method passes the command to a device driver for execution.

At block 606, the device driver attempts the I/O operation by sending the request on to the storage device. In one embodiment, the device driver passes on the state signal that indicates a level of error recovery to be performed at the storage device when an I/O operation fails. In other embodiments, the device driver performs error recovery techniques based on the embedded state signal. At block 608, the method determines if the I/O operation fails. If the I/O operation did not fail, the method is done at block 612 and a success indicator is returned. If, however, the method determines that the I/O operation failed at block 608, the method proceeds to block 610 and performs the level of error recovery specified in the state signal. For example, if the state signal indicated that no error recovery is to be performed, the process returns an error message and ends at block 612. Otherwise, if the state signal indicates that error recovery is to be performed, the process returns to block 606 and attempts the I/O operation as specified according to the state signal that sets the error recovery level.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions on a machine-readable medium for execution by the programmable processor. A process embodying these techniques may be performed by a programmable processor executing a program of instructions to perform desired functions by operating on input data and generating appropriate output. The techniques may be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Machine-readable media or storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

What is claimed is:

1. A method, comprising:
tuning error recovery in a storage device by:
    receiving a user command to set an error recovery level of the storage device;
    propagating the user command down the layers of the input/output stack;
    as the user command is propagated, selectively modifying the user command;
    when the command indicates one state, enabling limited error recovery for failed input/output operations; and
    when the command indicates another state, enabling a higher level of error recovery for failed input/output operations.

2. The method of claim 1, wherein receiving a command to set the error recovery level comprises receiving a command over a management interface.

3. A method, comprising:
receiving a request for an input/output operation;
determining an error recovery level to use if the input/output operation fails;
embedding a state signal that indicates the error recovery level into a command to execute the input/output operation;
issuing the command;
propagating the command down an input/output stack to a storage device; and
selectively modifying the command as the command propagates down the layers of the input/output stack.

4. The method of claim 3, wherein embedding a state signal comprises embedding a state signal in an input/output command issued to a device driver.

5. The method of claim 4, wherein propagating the command comprises passing the command from the device driver to the storage device.

6. The method of claim 3, wherein embedding a state signal comprises setting a value of a bit in an input/output command to one of two states with one state for a high level of error recovery and another state for a lower level of error recovery.

7. The method of claim 3, wherein embedding a state signal comprises setting a value of N bits in an input/output command to one of up to $2^N$ states associated with selectable levels of error recovery.

8. The method of claim 3, wherein determining an error recovery level comprises determining whether redundant data is available on a separate storage device.

9. A machine-readable medium having instructions stored thereon for performing a method for executing an input/output operation with a selectable error recovery level, the method comprising
    receiving a request for an input/output operation from an application program;
    determining whether the requested input/output operation relates to redundant data controlled by a logical storage manager;
    generating a state signal for use in error recovery if the input/output operation fails, wherein the state signal is based on the determination as to the existence of redundant data;
    embedding the state signal into a field of a command to execute the input/output operation;
    issuing the command;
    propagating the command down an input/output stack from the logical storage manager to a storage device; and
    selectively modifying the command as the command propagates down the layers of the input/output stack.

10. A system comprising:
a host system running an operating system and at least one application;
at least one storage device, coupled to the host system, for storing data;
wherein the operating system includes at least one device driver, in communication with the at least one storage device, and
wherein the operating system selectively tunes the level of error recovery associated with an input/output request as the request is propagated down the input/output stack between the application and the storage device.

11. The system of claim 10, wherein the operating system includes a logical volume manager layer that determines whether to alter an embedded state signal in an input/output request from the at least one application before propagating the input/output request to the at least one device driver.

12. The system of claim 11, wherein the at least one device driver further determines whether to alter the embedded state signal in the input/output request from the logical volume manager layer before propagating the input/output request to the at least one storage device.

* * * * *